(12) United States Patent
Bertoldo et al.

(10) Patent No.: US 11,779,047 B2
(45) Date of Patent: Oct. 10, 2023

(54) FORMING APPARATUS AND METHOD FOR FORMING A CONTINUOUS TUBULAR ROD FROM A CONTINUOUS TOW MATERIAL

(71) Applicant: PHILIP MORRIS PRODUCTS S.A., Neuchatel (CH)

(72) Inventors: Massimiliano Bertoldo, Castel Maggiore (IT); Fabio Cantieri, Bologna (IT); Ivan Prestia, Calderara di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 191 days.

(21) Appl. No.: 17/442,727

(22) PCT Filed: Mar. 24, 2020

(86) PCT No.: PCT/EP2020/058149
§ 371 (c)(1),
(2) Date: Sep. 24, 2021

(87) PCT Pub. No.: WO2020/193545
PCT Pub. Date: Oct. 1, 2020

(65) Prior Publication Data
US 2022/0184899 A1 Jun. 16, 2022

(30) Foreign Application Priority Data
Mar. 28, 2019 (EP) .................................... 19165803

(51) Int. Cl.
*A24D 3/02* (2006.01)
*B29C 35/04* (2006.01)
(Continued)

(52) U.S. Cl.
CPC .......... *A24D 3/0229* (2013.01); *B29C 35/049* (2013.01); *B29C 70/30* (2013.01);
(Continued)

(58) Field of Classification Search
CPC .................................................. A24D 3/0229
See application file for complete search history.

(56) References Cited

U.S. PATENT DOCUMENTS

| 3,313,665 | A | * | 4/1967 | Berger | ................... | A24D 3/022 |
| | | | | | | 156/441 |
| 3,560,298 | A | | 2/1971 | McArthur | | |
| 2014/0034571 | A1 | | 2/2014 | Torai | | |

FOREIGN PATENT DOCUMENTS

| CN | 203435668 | 2/2014 |
| EP | 0 325 630 | 9/1991 |

(Continued)

OTHER PUBLICATIONS

International Preliminary Report on Patentability for PCT/EP2020/058149 dated May 31, 2021 (15 pages).
(Continued)

*Primary Examiner* — Jeffry H Aftergut
(74) *Attorney, Agent, or Firm* — Mueting Raasch Group

(57) ABSTRACT

The forming apparatus comprises a forming device with a tubular element adapted to form continuous tow material into a continuous tubular rod. The forming device comprises a fluid compressor for generating pressurized fluid, the fluid compressor being in fluid connection with the tubular element to provide pressurized fluid to the continuous tubular rod to heat or cool the continuous tubular rod. The forming device further comprises several fluid conduits to provide pressurized fluid from the fluid compressor to several injection sites arranged along the transport path, wherein at least two fluid conduits of the several fluid conduits comprise a pressure control unit including a pressure sensor and a pressure influencer.

14 Claims, 3 Drawing Sheets

(51) Int. Cl.
  *B29C 70/44* (2006.01)
  *B29C 70/30* (2006.01)
  *B29K 1/00* (2006.01)
  *B29L 23/00* (2006.01)

(52) U.S. Cl.
  CPC ............ B29C 70/446 (2013.01); *A24D 3/022* (2013.01); *A24D 3/0233* (2013.01); *A24D 3/0295* (2013.01); *B29K 2001/12* (2013.01); *B29L 2023/22* (2013.01)

(56) References Cited

FOREIGN PATENT DOCUMENTS

| KR | 2017-0075849 | 7/2017 |
|----|--------------|--------|
| WO | WO 2016/079469 | 5/2016 |
| WO | WO 2016/097016 | 6/2016 |
| WO | WO 2017/032755 | 3/2017 |
| WO | WO 2017/089514 | 6/2017 |
| WO | WO 2017/093131 | 6/2017 |
| WO | WO 2017/114871 | 7/2017 |
| WO | WO 2017/198995 | 11/2017 |

OTHER PUBLICATIONS

PCT International Search Report and Written Opinion for PCT/EP2020/058149 dated Jun. 9, 2020 (12 pages).

* cited by examiner

FORMING APPARATUS AND METHOD FOR FORMING A CONTINUOUS TUBULAR ROD FROM A CONTINUOUS TOW MATERIAL

This application is a U.S. National Stage Application of International Application No. PCT/EP2020/058149 filed Mar. 24, 2020, which was published in English on Oct. 1, 2020, as International Publication No. WO 2020/193545 A1. International Application No. PCT/EP2020/058149 claims priority to European Application No. 19165803.8 filed Mar. 28, 2019.

The invention relates to a forming apparatus and a method for forming a tubular rod from a tow material.

There are known apparatus and methods for forming hollow acetate tubes by using plasticizer. Typically, plasticizer is spread onto acetate tow. The treated tow is then heated and formed into a rod shape. Heat treatment with steam followed by cooling with air stabilizes the tow material in its rod shape. A heating and cooling regime influences the rod forming process, such that heating and cooling not adapted to the specific materials used may negatively affect the rod forming process.

It is desirable to have a forming apparatus and a method improving the forming process of a tubular rod. In particular, it is desirable to have better control of the forming process to improve the quality and consistency of formed rods.

According to the invention, there is provided a forming apparatus comprising a transport path including a feed path for continuously feeding a continuous tow material along a transport direction of the transport path. The apparatus comprises a forming device connected to a downstream end of the feed path, which forming device is adapted to form the continuous tow material into a continuous tubular rod. The forming device comprises a tubular element adapted to allow the continuous tow material to pass through the tubular element to form the continuous tubular rod. The forming device further comprises a fluid compressor adapted to generate pressurized fluid. The fluid compressor is in fluid connection with the tubular element to provide pressurized fluid to the continuous tow material or to the continuous tubular rod, respectively, to heat or cool the continuous tow material or the tubular rod with the pressurized fluid. The forming device further comprises several fluid conduits to provide pressurized fluid from the fluid compressor to several injection sites arranged along the transport path for subsequently heating or cooling the continuous tow material in the tubular element. At least two fluid conduits of the several fluid conduits comprise a pressure control unit including a pressure sensor and a pressure influencer.

The pressurized fluid is provided from the fluid compressor via a distribution system comprising the several fluid conduits to the forming device. Preferably, two to ten fluid conduits, more preferably three to seven fluid conduits, for example five fluid conduits are available in the forming apparatus. For example, a fluid conduit may be a pipe, tube or channel or a combination of pipes, tubes and channels.

The pressure control units may be arranged in the forming apparatus between the fluid compressor and the tow material in the tubular element or the continuous rod formed in the tubular element. Preferably, a pressure control unit, in particular a pressure sensor, is arranged close to the position where the tow material is treated with pressurised fluid. This advantageously allows to very precisely measure the pressure of the pressurised fluid acting on the tow material. A pressure influencer arranged close to the injection site of the pressurized fluid allows to set or adjust pressure differences of the pressurized fluid at the injection site to a desired pressure of fluid acting on the tow material.

The pressure influencer may be used, for example, to make up for pressure losses between the fluid compressor and the tow material. For example, pressure losses may be caused by pressure drops in the distribution system of the forming apparatus. The pressure influencer may also be used to generally further pressurise or diminish the pressure of the pressurized fluid provided by the fluid compressor. By this, a compressor may be set to produce pressurized fluid to a pre-set value, for example an average value. Preferably, individual adaption of the pressure of the pressurized fluid is performed in the individual fluid conduits close to the injection site of the fluid. By using a pressure control unit, also fluid compressors may be used that are not capable of providing pressurized fluid in a desired pressure range. The desired pressure range may then be achieved by the pressure control unit.

Preferably, the pressure control units are arranged as close as possible to the tow material to be treated in order to keep pressure losses of the pressurized fluid as low as possible after a pressure of the fluid has been set or adapted to a desired value. Advantageously, in this way, measured pressures correspond precisely to the actual pressure of the pressurized fluid acting on the tow material.

Preferably, the pressure control units are arranged in end sections of the at least two fluid conduits at the injection sites of the pressurized fluid.

Preferably, a pressure sensor is arranged upstream of the pressure influencer. By this, a measured pressure value of the pressure sensor may directly be used to activate the pressure influencer.

The pressure influencer may be a pressure enhancer or a pressure diminisher or a pressure enhancer and diminisher.

Preferably, the pressure influencer is a pressure regulator adapted and capable to diminish a pressure, more preferably adapted and capable to diminish or enhance a pressure in a fluid conduit, more preferable in the at least two fluid conduits.

A pressure regulator may, for example, be a restrictor restricting a passage of pressurized air in the fluid conduit.

A pressure regulator may, for example, be an activatable propeller arranged in a fluid conduit. Working as a pressure diminisher, the propeller may slow down a flow of pressurized fluid passing the fluid conduit. Working as a pressure enhancer, the propeller may accelerate a flow of pressurized fluid passing the fluid conduit. A propeller may also be used to vary the speed of pressurized fluid passing through the fluid conduit.

Preferably, at least one of the pressure regulators comprises or is a propeller arranged in the fluid conduit.

Preferably, the at least two fluid conduits are provided with the same type of pressure influencer.

A pressure influencer may, for example, also be a valve arranged in the fluid conduit.

More than two fluid conduits of the several fluid conduits, for example three or four fluid conduits or preferably each fluid conduit of the several fluid conduits may comprise a pressure control unit. If several or all fluid conduits comprise a pressure control unit, a forming process, in particular the cooling part of the forming process may very closely be controlled. In particular the forming process may be changed or adapted to achieve an optimised result.

The forming apparatus may in particular be used for the rod forming of various continuous materials, in particular when provided with different plasticizers or different hardening agents. The close control allows to adapt the forming process to various hardening regimes of material combinations used in the forming apparatus of the present invention.

The heating may basically be used to liquefy and preferably evenly distribute a plasticizer in the tow material.

The cooling may basically be used to harden a previously liquefied plasticizer and to fix the rod in its tubular rod shape. For example, cooling accelerates a curing of plasticizer and may thus quickly stabilize the continuous rod. With a controlled cooling the curing process may be closely controlled. Additionally, the rod forming process may be adapted to different tow materials and different plasticizers requiring different pressure or temperature regimes for best results.

Preferably, cooling is performed after heating, that is, downstream of a heating process. Heating and cooling may be performed in the tubular element. Cooling may also be performed downstream of the tubular element.

Preferably, each pressure control unit is operated individually and independently of other pressure control units. Thus, preferably, the pressure is controllable individually in the at least two fluid conduits. Preferably, the pressure is controllable individually in each fluid conduit provided with a pressure control unit. Preferably, the pressure control units are mutually coordinated such that the heating process or the cooling process or both the heating and the subsequent cooling process, of the tow material or of the formed rod may closely be controlled and successively be influenced if needed.

Preferably, the amount of pressurized fluid provided from the fluid compressor to the several fluid conduits is controlled for each fluid conduit. For example, each fluid conduit may be provided with a valve. In such embodiments, the valve may preferably individually be controlled. For example, the distribution system comprises a manifold connected to the fluid compressor at an inlet end of the manifold and connected to the several fluid conduits at several outlets ends of the manifold. The valves may be arranged close to each outlet end of the manifold. For example by the provision of valves a certain amount of pressurized fluid or a larger amount of pressurized fluid may be provided to upstream arranged fluid conduits (upstream relative to the transport path of the tow material) to enhance a heating or a cooling effect, while downstream arranged fluid conduits may, for example, be provided with a smaller amount of pressurized fluid, or vice versa.

Preferably, at least some of the several injection sites are arranged along the transport path, preferably, along a length of the tubular element. By this, a heating or a cooling process may sequentially act on the formed rod or on the rod being formed.

The tubular element of the forming device may comprise a plurality of tubular element segments. Preferably, each tubular element segment of the plurality of tubular element segments comprises an injection site. Thus, each tubular element segment may be connected to at least one fluid conduit for providing pressurised fluid to the tow material passing the tubular element segment. One fluid conduit may be provided per tubular element segment.

Preferably, an injection end of the at least two fluid conduits, these fluid conduits comprising the pressure control unit comprises a nozzle. Preferably, the injection ends of the at least two fluid conduits are formed as a nozzle. Over a nozzle the pressurized fluid may very efficiently be introduced into and spread over the tow material or over the formed rod, respectively. In particular, when using a fibrous tow material, the pressurized fluid very effectively may penetrate the tow material and heat or cool the tow material or rod. Preferably, an injection end of each fluid conduit of the several fluid conduits comprises a nozzle.

The fluid compressor of the forming apparatus may be a steam generator adapted to generate overheated steam or may be an air compressor adapted to generate pressurized air.

Overheated steam is used for heating the continuous tow material. Preferably, pressurized air is used for cooling the continuous tow material or the continuous rod formed from the tow material.

To provide either overheated steam or pressurized air to the tow material, the same distribution system or separate distribution systems may be used. Preferably, pressurized fluid is provided via several injection sites to the tow material for example over the length of the tubular element. Preferably, some of the injection sites are provided with overheated steam and other injection sites are provided with pressurized air.

Steam generators are known heating devices in the manufacture of rods due to the good heat transfer from the steam to the tow material. However, steam may cause water droplets to form when cooled. Water droplets may negatively affect the tow material and a forming result. The use of overheated steam reduces or prevents the formation of water droplets. Overheated steam has good heat transfer to the tow material.

At least one of the fluid conduits of the several fluid conduits may comprise a temperature control unit comprising a temperature sensor and a temperature influencer.

Preferably, the temperature control unit is arranged in the forming apparatus between the fluid compressor and the tow material in the tubular element. Preferably, the temperature control unit, in particular a temperature sensor, is arranged close to the position where the tow material is treated with pressurized fluid. This advantageously allows to very precisely measure the temperature of the pressurized fluid acting on the tow material. With a temperature influencer present close to the injection site of the pressurized fluid, temperature differences of the pressurized fluid to a desired temperature of the fluid for heating or for cooling the tow material may be set or adjusted by the temperature influencer. The temperature influencer may be used, for example, to make up for temperature losses of the pressurized fluid delivered from the fluid compressor to the tow material. For example, temperature losses caused by environmental influences acting on the forming apparatus, for example due to a path length the pressurized fluid has to travel. The temperature influencer may also be used to generally heat or cool the pressurized fluid provided by the fluid compressor. By this, a fluid compressor may be set to generate pressurized fluid at a specific temperature and individual adaption of the temperature of the fluid is performed in the individual fluid conduits close to the injection site of the pressurized fluid. This also provides the option to apply a more or less intense heating or cooling action to a tow material or a rod formed.

Preferably, a temperature control unit is arranged as close as possible to the tow material to be treated. Advantageously, in this way measured temperatures correspond precisely to the desired temperature of the pressurized fluid acting on the tow material.

Preferably, the temperature control unit is arranged in an end section of a fluid conduit at the injection site of the pressurized fluid.

Preferably, the temperature sensor is arranged in a nozzle of a fluid conduit.

A temperature influencer may be a heating element, which is able to heat the pressurized fluid, a cooling element, which is able to cool the pressurized fluid or a heating and cooling element, which is able to either heat or cool the pressurized fluid as required.

Preferably, the temperature influencer is a heating and cooling element. Pressurized fluid may then be heated or cooled depending on the temperature of the pressurized fluid provided by the fluid compressor and depending on a temperature desired at a specific location of the tow material and at a specific state of the forming process.

A heating element or a cooling element may be electric elements, for example a resistive heater, an inductor and for example an inductively heatable fluid conduit or a Pelletier element. Heating or cooling elements may also be based on fluid heating or fluid cooling.

Preferably, a heating element is a resistive heater arranged around a fluid conduit.

Preferably, a combined heating and cooling element is based on fluid heating and fluid cooling. For example, an external tube may be arranged around a fluid conduit. A cooling or heating fluid may be guided along the fluid conduit between the external tube and the outside of the fluid conduit, thereby cooling or heating the fluid conduit and the pressurized fluid flowing inside the fluid conduit.

A temperature influencer may be arranged inside a fluid conduit, for example at an inner wall of the fluid conduit, in a fluid conduit wall or outside of the fluid conduit, for example arranged around the fluid conduit. If an external temperature influencer is used, preferably the material of the fluid conduit comprises high heat conductivity at least in the region of the external temperature influencer.

More than one fluid conduit of the several fluid conduits, for example three or four or even each fluid conduit of the several fluid conduits may comprise a temperature control unit. If more than one fluid conduit or all fluid conduits comprise a temperature control unit. Advantageously, in this way, the forming process may be very closely controlled, for example changed or adapted in order to achieve an optimised result.

Is a fluid compressor in the form of a gas compressor used in the forming apparatus and the distribution system and fluid conduits of the distribution system used for guiding pressurized air to the tow material, then the pressure control units and temperature control units are used for controlling the pressure and temperature of the pressurized air.

Is a fluid compressor in the form of a steam generator used in the forming apparatus and the distribution system and fluid conduits of the distribution system used for guiding overheated steam to the tow material, then the pressure control units and temperature control units are used for controlling the pressure and temperature of the overheated steam.

Is a fluid compressor in the form of a steam generator as well as a gas compressor used in the forming apparatus, both fluid compressors may be connected to the same distribution system. Overheated steam and pressurized air may be guided through the same or through different fluid conduits in the distribution system. Accordingly, the pressure control units and temperature control units may control the pressure and temperature of overheated steam and of pressurized air.

Preferably, overheated steam and pressurized air is guided through different fluid conduits in the same distribution system. Preferably, overheated steam is guided through fluid conduits leading to more upstream arranged injection sites of the tubular element. Preferably, pressurized gas is guided through fluid conduits leading to more downstream arranged injection sites of the tubular element. Preferably, overheated steam is provided to the two to three most upstream arranged injection sites of the tubular element. Preferably, pressurized air is provided to at least the most downstream arranged injection site of the tubular element.

According to the invention, a mandrel may be provided within the tubular element or within one or several of the tubular element segments. A mandrel can be used to create an interior shape within the formed rod, for example to create a so called hollow acetate tube or HAT. In some embodiments, the mandrel comprises a circular cross section, however other cross sections are possible, for example in the form of a polygon like a triangle, square, star or others, in the form of type or icons like for example hearts, clubs or diamonds or other round, oval or semi-round forms. Additionally, the cross-section of the mandrel may be continuous. Alternatively, the cross-section of the mandrel may change over the length of the mandrel. Preferably, the mandrel extends across a length of the tubular element that is heated or across all tubular element segments which are heated, that is, provided with overheated steam. This advantageously aids in bringing the tow into the desired form while it is still hot. Preferably, the mandrel extends into at least one of the tubular element segments, which is provided with pressurized air for cooling. This advantageously allows the tow to settle into the desired form. Preferably, the mandrel does not extend into at least one tubular element segment, which is provided with pressurize air for cooling. This advantageously facilitates the removal of the tow from the mandrel.

Tubular rods, filled or hollow rods may be manufactured with the forming device of the forming apparatus. For manufacturing a hollow rod, the tubular element comprises an inner core or mandrel for forming a continuous hollow tubular rod from the continuous tow material. Preferably, the mandrel is arranged concentrically inside the tubular element or inside one, several or all tubular element segments.

In other embodiments of the invention, at least one of the tubular element segments comprises a formed inner tube located within the tubular element segment, such that the tow passing through the tubular element segment passes along the inner surface of the formed inner tube. The formed inner tube may thus impart its form onto the outside of the tow during the forming. For example, the formed inner tube comprises a circular cross section, however other cross sections are possible, for example in the form of a polygon like a triangle, square, star or others, in the form of type or icons like for example hearts, clubs or diamonds or other round, oval or semi-round forms. Particularly advantageously, the formed inner tube creates a number of flutes along the periphery of the formed tow.

Additionally, the cross-section of the inner surface of the formed inner tube may be continuous. Alternatively, the cross-section of the formed inner tube may change over the length of the formed inner tube. A changing cross section may for example create helical flutes along the periphery of the formed tow.

Preferably, the forming apparatus comprises a main control system. The main control system controls the forming process of the continuous rod. For example, data from the pressure control units, where available also data from the temperature control units, where available data from valves and preferably also data from the final formed rod is received in the main control system. Data from the final formed rod may, for example, be a rod diameter gained from a line-scan camera. In the main control system, the data may be analysed and if deviations from a desired result are detected, the forming parameters may be adjusted. The main control unit may accordingly give instructions to the pressure control units, temperature control units, valves or further elements of the forming apparatus, for example to a distribution system or plasticizer applicator. The main control unit may be used to control further devices of a manufacturing line in a rod forming process, for example a cutting device for cutting the continuous rod into individual segments. Via the main control system, forming parameters, such as heating, cooling or pressure applied to the tow material may be controlled, adjusted and recorded.

The invention also refers to a method for forming a continuous tubular rod from a continuous tow material. The method comprises providing a continuous tow material, forming the continuous tow material to a continuous tubular rod in a forming device, heating or cooling, preferably heating and cooling, the continuous tow material during forming by providing pressurized fluid from a fluid compressor via a distribution system to the continuous tow material. The method further comprises measuring the pressure of the pressurized fluid in at least two fluid conduits of the distribution system and providing at least two pressure influencers in the distribution system downstream of the fluid compressor. The pressure influencers are capable of and adapted to measuring and changing a pressure of the pressurized fluid delivered from the fluid compressor to the continuous tow material.

Preferably, the continuous tow material is fed to a forming device and formed to a continuous tubular rod by passing the continuous tow material through a tubular element of the forming device. The pressurized fluid is then guided into the tubular element.

Preferably, the step of changing a pressure of the pressurized fluid delivered from the fluid compressor to the continuous tow material or to the tubular rod comprises enhancing or diminishing the pressure, preferably by a propelling action of the pressurized fluid. A propelling action is advantageous as it may be used as pressure enhancer and pressure diminisher.

Preferably, the method comprises measuring the temperature of the pressurized fluid at an injection site and providing a temperature influencer in the distribution system. The temperature influencer is adapted to and capable of changing the temperature of the pressurized fluid delivered to the continuous tubular rod or the tow material.

Preferably, the temperature influencer comprises a heating or cooling element, more preferably a heating and cooling element.

Preferably, the continuous tow material is cellulose acetate.

Preferably, the continuous tubular rod is a continuous hollow acetate tube (HAT).

The method may further comprise the step of applying plasticizer to the continuous tow material before forming the continuous tubular rod, in particular before heating the continuous tow material. The application of plasticizer to tow material before forming the material into a rod influences the rod material. For example, plasticizers may improve the forming characteristics of the tow material, may enhance stability of the final rod or may influence a resistance to draw of the formed rod or combinations of these effects.

The method may further comprise the step of cutting the continuous tubular rod into individual segments. The individual segments may have a final length of a segment of an aerosol-generating article. The individual segments may also have a multiple-length of a final length and may be cut to their final length in a further process step in the manufacturing process of aerosol-generating articles.

While the apparatus and method have been described using pressurized air for cooling, it is understood that pressurized air may also be used for heating and that also other gases suitable for cooling or heating may be used. In particular compressed gases that are compressed in the gas compressor could be used alternatively or in addition, for example, pressurized carbon dioxide or nitrogen.

The invention also refers to a manufacturing line for manufacturing a continuous tubular rod. The manufacturing line comprises a forming apparatus according to the invention and as described herein. The manufacturing line further comprises a plasticizer applicator arranged upstream of the forming apparatus. The plasticizer applicator is provided for applying plasticizer to the continuous tow material. The manufacturing line may further comprise a cutting device arranged downstream of the forming device for cutting the continuous tubular rod into individual rod segments.

The invention is further described with regard to embodiments, which are illustrated by means of the following drawings, wherein.

Figure 3:
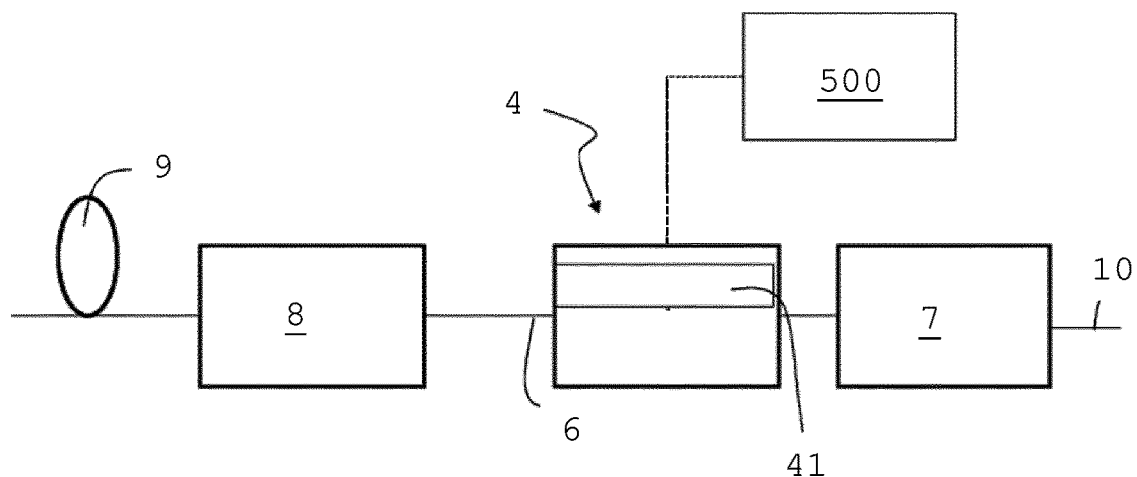
Figure 4:
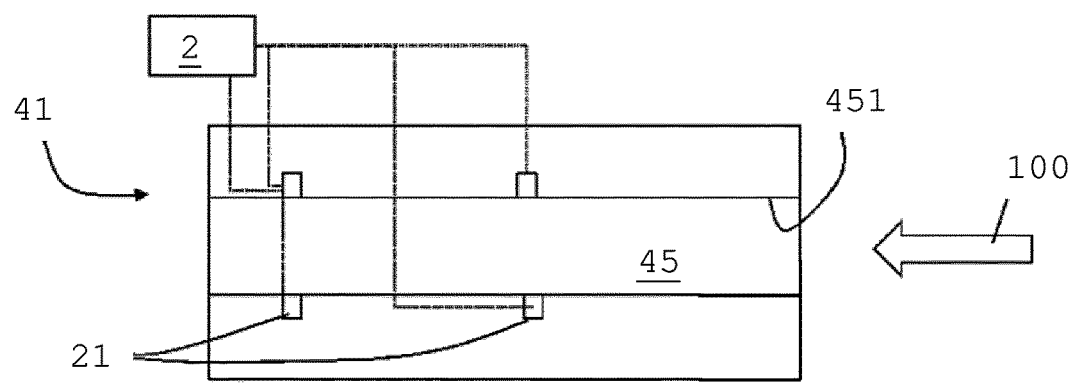

FIG. 3 schematically shows a continuous rod manufacturing line;

FIG. 4 is a schematic illustration of a forming apparatus for example used in the manufacturing line shown in FIG. 3.

Figure 5:
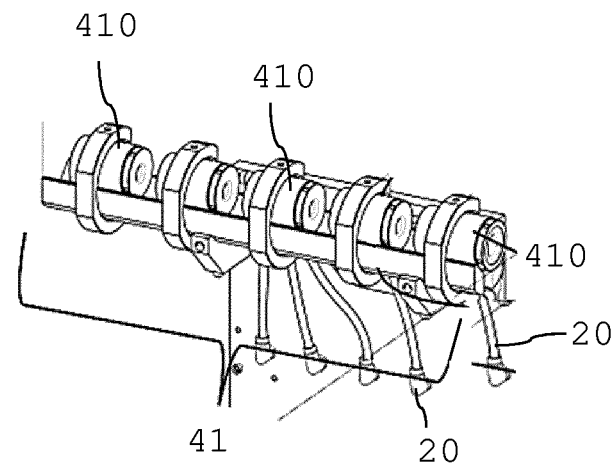
Figure 6:
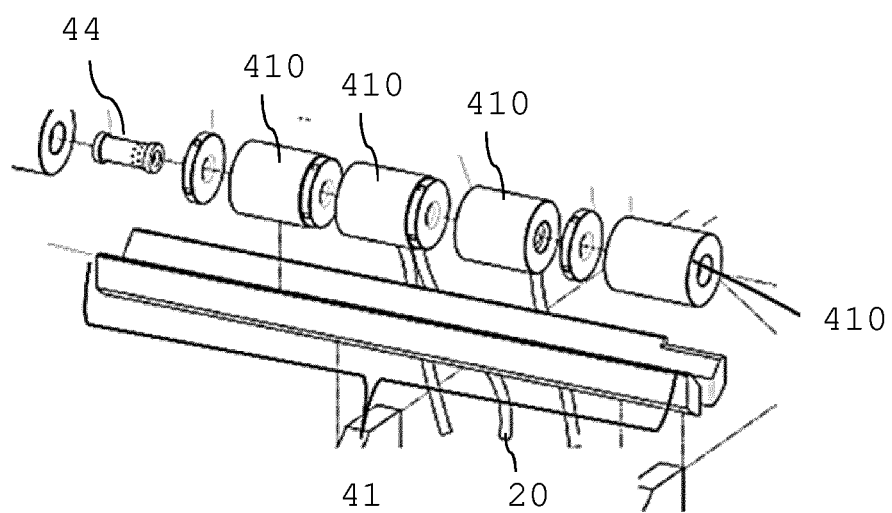

FIG. 5 shows a perspective view of a forming apparatus comprising several tubular element segments;

FIG. 6 shows a forming apparatus with formed inner tube within the tubular element segments.

Figure 1:
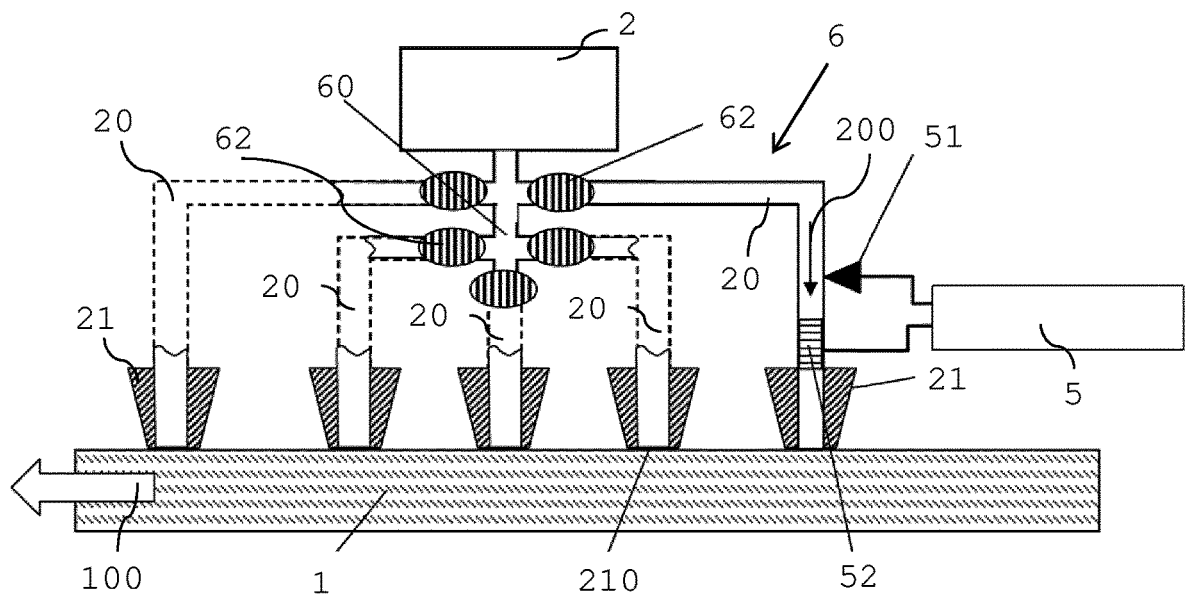
FIG. 1 is a schematic view of a forming apparatus.

In FIG. 1 the continuous material 1, for example tow material impregnated with a plasticizer, for example triacetin, is guided along the transport direction 100. The continuous material is guided through a tubular element (not shown) and thereby treated with a pressurized fluid. The pressurized fluid may, for example, be overheated steam or pressurized air or both pressurized air and overheated steam, preferably in subsequent order for heating then cooling the continuous tow material when being guided through the tubular element.

The pressurized fluid is generated in a fluid compressor 2 and guided via fluid distribution system 6 to the tow material 1. Thereby the pressurized fluid is guided to the tubular element where the tow material 1 is passing through and thereby formed into a rod. The flow direction of the pressurized fluid is shown by arrow 200.

The distribution system 6 comprises a manifold 60 distributing the pressurized fluid from the fluid compressor 2 into a plurality of individual pipes 20. Each pipe 20 comprises a valve 62, by which an amount of pressurized fluid led into the individual pipes 20 from the fluid compressor 2 is individually controlled, preferably by a main control system.

The pipes 20 end in nozzles 21 focusing the pressurized fluid via injection sites 210 in the tubular element to the tow material 1. This end portion of the distribution system is provided with a pressure control unit 5. The pressure control unit 5 comprises a pressure regulator 52 arranged in the pipe 20, for example a valve. The pressure control unit 5 also comprises a pressure sensor 51 arranged upstream of the pressure regulator 52. The pressure control unit 5 may also comprise a data control system and a power system for retrieving data from the pressure sensor 51 and the pressure regulator 52 and for providing the pressure regulator 52 with power when needed to pressurize the pressurized fluid to a higher pressure.

While the distribution system 6 and pressure control is shown in FIG. 1 by way of one pipe 20 provided with a pressure control unit 5, the distribution system 6 comprises at least two pipes 20 provided with a pressure control unit 5. The at least two pressure control units 5 may be provided in neighbouring pipes 20 or in more distantly arranged pipes 20. Preferably, a pressure control unit 5 is arranged in the most upstream arranged pipe 20 of the distribution system in fluid connection with a most upstream arranged injection site 210.

Preferably, several or all five pipes shown in FIG. 1 are provided with their own individually controlled pressure control unit 5.

Data control and power system for the pressure control units 5 are preferably integrated in a main control system provided for control of the forming apparatus and possibly also of further devices used in the rod manufacturing process.

In FIG. 1 the fluid compressor 2 might be a gas compressor for generating pressurized air or a steam generator for generating overheated steam. The fluid distribution system 6 then is used either as air distribution system guiding pressurized air to the continuous tow material 1 or as steam distribution system guiding overheated steam to the continuous tow material 1.

In a preferred embodiment of the forming apparatus of FIG. 1, the fluid compressor 2 comprises a steam generator and a gas compressor. The fluid compressors are connected to the manifold and distribution system such that at least the first two pipes when seen in the transport direction 100 (two most upstream arranged pipes) are provided with overheated steam and such that at least the last pipe when seen in transport direction 100 (one most downstream arranged pipe) is provided with pressurized air for cooling.

Further or intermediate pipes may be pressurized with overheated steam or with pressurized gas depending on a desired heating and cooling process.

The fluid compressors may be connected to their own manifold and distribution system, however, preferably providing overheated steam and pressurized air in the above-mentioned serial arrangement.

Figure 2:
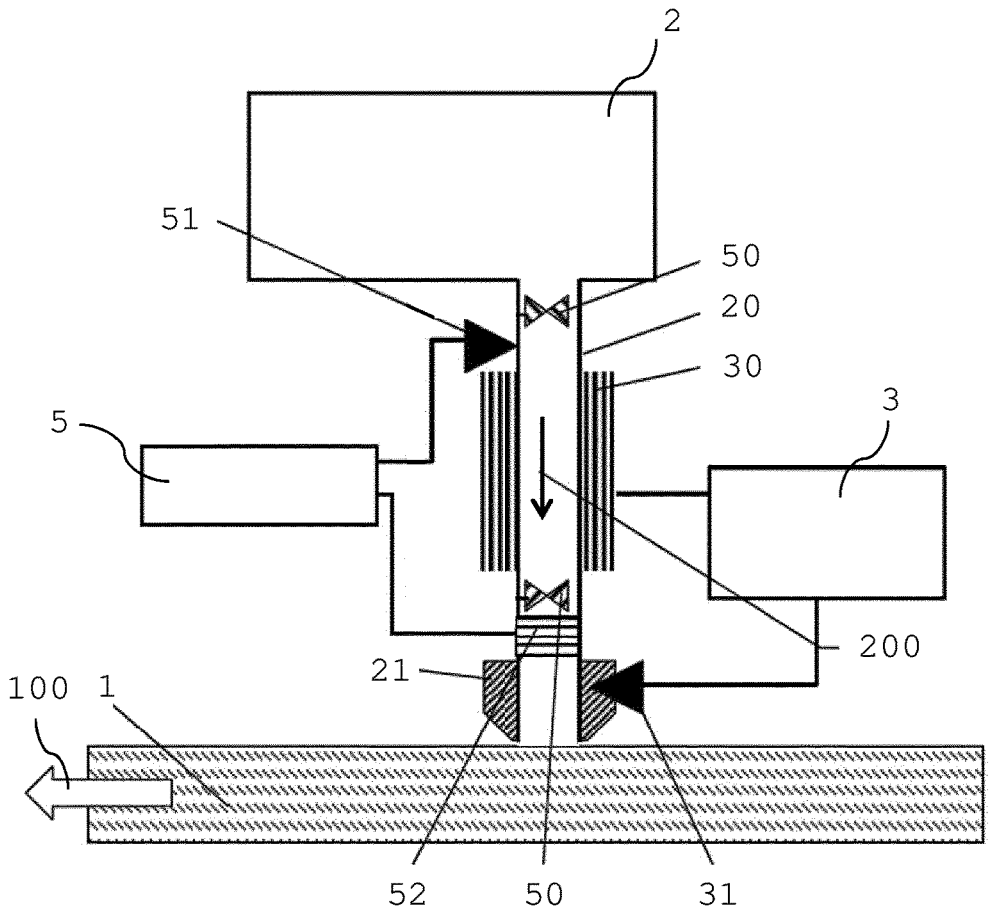
FIG. 2 is a schematic view of a forming apparatus including temperature control unit.

FIG. 2 shows in a simplified manner another example of a forming apparatus. The same or similar reference signs are used for the same or similar features as in FIG. 1.

The forming apparatus comprises a fluid compressor 2 and a distribution system wherein only one pipe 20 of the distribution system is shown. The pipe 20 is provided with a pressure control unit 5 provided in a pipe end section of the distribution system.

The pipe 20 is additionally provided with a temperature control unit 3.

The continuous material 1 is guided along the transport direction 100 and through a tubular element (not shown), thereby treated with pressurized fluid, for example pressurized air, overheated steam or both with pressurized air and overheated steam.

The pressurized fluid is generated in a fluid compressor 2 and guided via distribution system to the tow material 1.

The flow direction of the pressurized fluid is shown by arrow 200.

The pipe 20 shown ends in a nozzle 21 focusing the pressurized fluid to the tow material 1, preferably in a circular manner to act onto the entire circumference of the tow material in the tubular element. The end portion of the distribution system is provided with a temperature control unit 3. The temperature control unit 3 comprises a heating element 30, for example a resistive heating element, surrounding the pipe 20. The temperature control unit 3 also comprises a temperature sensor 31 arranged in the nozzle 21. The temperature control unit 3 may also comprise a data control system and a power system for retrieving data from the temperature sensor 31 and from the heating element 30 and for providing the heating element 30 with heating power when needed to heat the pressurized fluid to a higher temperature and also to a higher pressure. The pipe 20 is made of a material to resist the heat provided by the heating element 30.

Data control and power system for the temperature control unit 3 may also be integrated in a main control system provided for control of the forming apparatus, in particular the pressure control units 5, and possibly also further devices used in the rod manufacturing process.

In some embodiments, the heating element 30 may be a cooling element or a combined heating and cooling element. By this, the pressurized fluid may be cooled, or may be heated or cooled depending on the temperature of the pressurized fluid delivered from the gas compressor 2 and the temperature of the pressurized fluid needed for treating the continuous material.

The pressure control unit 5 in FIG. 2 comprises a pressure sensor 51 for measuring the pressure of the pressurized fluid. The pressure sensor is arranged upstream of a heating element 30. The pressure control unit 5 also comprises a pressure influencer 50,52. The pressure influencer in the embodiment shown consists of two propellers 50 and a pressure regulator 52, for example a valve.

One of the propellers 50 is arranged in the pipe upstream of the pressure sensor 51. The second propeller 50 is arranged downstream of the heating element 30 but upstream of the pressure regulator 52 when seen in flow direction of the pressurized fluid. Preferably, a velocity sensor is arranged at the position of the second propeller for measuring the velocity of the pressurized fluid. As the pressure regulator is arranged immediately upstream of the nozzle 21, where the pressurized fluid is introduced into the tubular element 41, with the pressure regulator, the pressure of the pressurized fluid to be applied to the tow material may be controlled and adjusted very precisely. In particular, any pressure increase possibly occurring due to a heating of the pressurized fluid, may be equalized by the pressure regulator 52.

The various sensors and actuators may measure and act on pressure, temperature and velocity of the pressurized fluid.

As already mentioned for the embodiment of the forming apparatus of FIG. 1, also the forming apparatus shown in FIG. 2 may comprise several pipes and a plurality or all pipes may be provided with their own individually controlled pressure control unit 5 and with their own individually controlled temperature control unit 3.

Temperature and pressure control units 3,5 allow to adjust the temperature, pressure and velocity of the pressurized fluid after the pressurized fluid has left the fluid compressor 2 and basically at the exit of the one or several pipes 20. The serial provision of injection nozzles and temperature and pressure control units 3,5 allows to get, preferably independently, temperature and pressure profiles successively at different application points in the rod forming process.

This also applies if one or more upstream arranged pipes are used for heating and one or more downstream arranged pipes are used for cooling, for example by application of overheated steam in an upstream portion of the forming process and application of pressurized air in a downstream portion of the forming process. By measuring and adjusting the temperature and pressure of the overheated steam applied to the tow material a controlled plasticiser liquefaction and distribution in the two material may be achieved. By measuring and adjusting the temperature and pressure of the pressurized air applied to the tow material or to the already formed but not entirely stabilized rod, a controlled hardening and form stabilization of the formed rod may be achieved. This advantageously applies if the temperature and pressure is controlled sequentially in the heating process as well as in the cooling process.

FIG. 3 shows a manufacturing line for producing continuous rods or continuous rod components, preferably for aerosol-generating articles. Preferably, hollow rods of cellulose acetate are manufactured that are cut into segments. These segments may be used in heat-not-burn aerosol-generating articles.

The manufacturing line comprises a transport device 10 to transport continuous material, for example cellulose acetate tow material, along a transport or feeding direction 100.

Along the manufacturing line a preparation unit 7 is arranged. The tow material is fed to the preparation unit 7 by the transport device 3. The preparation unit 7 is adapted to form a continuous stream of tow material, moistened with a hardening fluid or plasticizer, such as for example triacetin. In the embodiment of FIG. 3, the plasticizer unit is part of the preparation unit 7. Plasticizer units are known in the art. The plasticizer unit may also be located upstream of the preparation unit 7. Downstream of the preparation unit 7, the manufacturing line includes a forming apparatus 4, arranged in series to the preparation unit 7. The forming apparatus 4 is adapted to receive the flow of tow material and to cause hardening of the material to transform the tow material into a continuous axially rigid rod.

Advantageously, the manufacturing line further includes a wrapping unit 8, to wrap the rod in a wrapping paper. Further, the manufacturing line may comprise a cutting unit 9, preferably a rotating cutting head of known type. The cutting unit 9 is arranged downstream of the forming apparatus 4 and wrapping unit 9 and adapted to cut the rod into rod segments. A desired length of the segments in which the rod is cut is for example obtained with the assistance of an appropriate measuring device (not shown).

Suitable wrapping unit 8, transport device 10 and cutting unit 9 are known in the art and not further described.

The manufacturing line includes a main control system 500 adapted to receive and send signals from and to the forming apparatus 4. With the main control system 500, for example pressure regulators may be controlled or, if present, the heating or non-heating of a temperature control unit. Preferably, the main control system 500 also controls further units of the manufacturing line, for example the preparation unit 7 and the transport device 10. Also the wrapping unit 8 and cutting unit 9 may be controlled by the main control system 500.

The forming apparatus 4 is shown in an enlarged view in FIG. 4. The forming apparatus 4 comprises a tubular element 41 adapted to receive the tow material saturated with hardening material. The transport direction of the transport device 10, as well as the feeding direction of the tow material into the tubular element 41 of the forming apparatus 4 is depicted with arrow 100.

The tubular element 41 is adapted to shape the tow material to transform it into a generally cylindrical rod, for example into a full rod or into a hollow rod, and to advance the rod in the feed direction 100 to the further components of the manufacturing line.

The tubular element 41 defines a hole 45 through which the tow material can pass. Preferably, the hole 45 comprises an inner surface 451. The inner surface 451 compresses the tow material to form a substantially cylindrical rod-like shaped continuous tow of material.

The tubular element 41 may comprise a mandrel arranged inside the tubular element. The continuous tow material is then guided around and along the mandrel and within the inner surface 451, thus forming a hollow tube of tow material.

The forming apparatus 4 further comprises a fluid compressor 2 in fluid connection with two circular nozzles 21 to inject pressurized fluid into the interior of the tubular element 41. The pressurized fluid either distributes or hardens the plasticizer present in the tow material and transforms it into a substantially rigid rod.

In the embodiment of FIG. 4, the tubular element 41 is a single continuous tubular element comprising two injection sites for the pressurized fluid to act on the continuous material. Preferably, more than two, for example three to five nozzles 21 are present for injecting pressurized fluid at three to five injections sites arranged along the tubular element 41.

In FIG. 5 the forming device comprises a tubular element 41 realized by a plurality of separated elements, here five tubular element segments 410, disposed in series along the feeding direction of the continuous material (right to left in FIG. 5).

At least the pipe 20 leading to the first of the separated element segments 410 (most upstream arranged segment) is provided with a pressure control unit 5 and preferably also with a temperature control unit 3 (not shown). Preferably the pipes leading to the first and second of the separated element segments 410 are provided with a pressure control unit 5 and most preferably also with a temperature control unit 3. Thus, at least the two most upstream arranged pipes 20 are made of a material resistant to the heat provided by the heating element 30.

Preferably, a last of the separated element segments 410 (most downstream arranged segment) is used for cooling the continuous rod, for example by guiding pressurized air to the interior of the element segment 410. A pipe 20 guiding the pressurized air to the last element segment 410 does not require the heat resistance of the pipes with the heating element and may thus be made of a less heat resistant material than the pipes provided with a heating element.

In FIG. 6, the last one of the tubular element segments 410 when seen in transport direction of the tow material, is shown to comprise a formed inner tube 44 located within the tubular element segment 410. The tow passing through the tubular element segment 410 passes along the inner surface of the formed inner tube 44. The formed inner tube thus imparts its form onto the outside of the tow during the forming. The inner surface of the formed inner tube 44 may represent the inner surface 451 of the tubular element as shown in FIG. 4.

Preferably, the formed inner tube comprises a substantially circular cross section. Particularly advantageously, the formed inner tube 44 creates a number of flutes along the periphery of the formed tow, for example for air to pass along the flutes. Preferably all tubular element segments 410 of the tubular element 41 comprise an inner tube 44. Most preferably, upstream arranged element segments 410 that are provided with overheated steam for heating the tow material are provided with an inner tube 44.

The invention claimed is:

1. A forming apparatus comprising:
a transport path including a feed path for continuously feeding a continuous tow material along a transport direction of the transport path;
a forming device connected to a downstream end of the feed path and adapted to form the continuous tow material into a continuous tubular rod, the forming device comprising:
a tubular element adapted to allow the continuous tow material to pass through the tubular element to form the continuous tubular rod;
a fluid compressor adapted to generate pressurized fluid, the fluid compressor being in fluid connection with the tubular element to provide pressurized fluid to the continuous tow material to heat or cool the continuous tow material;
wherein the forming device further comprises several fluid conduits to provide pressurized fluid from the fluid compressor to several injection sites arranged along the transport path, wherein at least two fluid conduits of the several fluid conduits comprise a pressure control unit including a pressure sensor and a pressure influencer, and
wherein the pressure control units are arranged in end sections of the at least two fluid conduits at the injection sites.

2. Forming apparatus according to claim 1, wherein the pressure influencers are pressure regulators capable to diminish or to enhance a pressure of the pressurized fluid in the at least two fluid conduits.

3. Forming apparatus according to claim 1, wherein each fluid conduit of the several fluid conduits comprises a pressure control unit.

4. Forming apparatus according to claim 1, wherein at least some of the several injection sites are arranged along a length of the tubular element.

5. Forming apparatus according to claim 1, wherein an injection end of the at least two fluid conduits comprises a nozzle.

6. Forming apparatus according to claim 1, wherein the tubular element comprises a plurality of tubular element segments, wherein each tubular element segment comprises an injection site.

7. Forming apparatus according to claim 1, wherein the fluid compressor is a steam generator adapted to generate overheated steam to provide overheated steam to continuous tow material in the tubular element or wherein the fluid compressor is an air compressor adapted to generate pressurized air to provide pressurized air to the continuous tow material in the tubular element.

8. Forming apparatus according to claim 1, wherein at least one of the fluid conduits of the several fluid conduits comprises a temperature control unit comprising a temperature sensor and a temperature influencer.

9. Manufacturing line for manufacturing a continuous tubular rod, the manufacturing line comprising a forming apparatus according to claim 1 and comprising a plasticiser application device arranged upstream of the forming apparatus for applying plasticiser to the continuous tow material.

10. Method for forming a continuous tubular rod from a continuous tow material, the method comprising:
providing a continuous tow material;
forming the continuous tow material to a continuous tubular rod in a forming device; and
heating or cooling the continuous tow material during forming by providing pressurized fluid from a fluid compressor via a fluid distribution system to the continuous tow material, thereby measuring the pressure of the pressurized fluid in at least two fluid conduits of the distribution system and providing at least two pressure influencers in the distribution system downstream of the fluid compressor, the pressure influencers capable of changing a pressure of the pressurized fluid delivered from the fluid compressor to the continuous tow material, thereby measuring and adapting the pressure of the pressurized fluid close to injection sites of the pressurized fluid.

11. Method according to claim 10, wherein changing a pressure of the pressurized fluid delivered from the fluid compressor to the continuous tow material comprises enhancing or diminishing the pressure by a propelling action of the pressurized fluid.

12. Method according to claim 10, comprising measuring the temperature of the pressurized fluid at the injection site and providing a temperature influencer in the distribution system, the temperature influencer being capable of changing the temperature of the pressurized fluid delivered to the continuous tow material.

13. Method according to claim 12, wherein the temperature influencer comprises a heating and cooling element.

14. Method according to claim 10, wherein the continuous tow material is cellulose acetate and the continuous tubular rod is a continuous hollow acetate tube (HAT).

* * * * *